US 8,483,618 B1

(12) United States Patent
Vargantwar et al.

(10) Patent No.: US 8,483,618 B1
(45) Date of Patent: Jul. 9, 2013

(54) INTELLIGENT DETERMINATION OF INITIAL TRANSMIT POWER BASED ON RADIO-FREQUENCY CONDITIONS

(75) Inventors: Sachin R Vargantwar, Overland Park, KS (US); Siddharth S Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 270 days.

(21) Appl. No.: 12/879,726

(22) Filed: Sep. 10, 2010

(51) Int. Cl.
*H04B 17/00* (2006.01)

(52) U.S. Cl.
USPC ............... 455/67.11; 455/412.1; 455/412.2; 370/328; 370/338

(58) Field of Classification Search
USPC ............ 455/67.11, 412.1, 412.2, 435.3, 522, 455/552.1; 370/328, 338, 395.21, 429
See application file for complete search history.

(56) References Cited

U.S. PATENT DOCUMENTS

| | | | |
|---|---|---|---|
| 6,708,041 B1 * | 3/2004 | Butovitsch et al. | 455/522 |
| 2010/0034177 A1 * | 2/2010 | Santhanam | 370/338 |

OTHER PUBLICATIONS

Unpublished U.S. Appl. No. 12/558,359, filed Sep. 11, 2009 entitled "Dynamic Paging Concatenation".
Unpublished U.S. Appl. No. 12/115,226, filed May 5, 2008 entitled "Managing Transmission Power for Message Waiting Notification".
Unpublished U.S. Appl. No. 12/699,244, filed Feb. 3, 2010 entitled "Advanced Transmit Power Correction".
Unpublished U.S. Appl. No. 11/558,691, filed Nov. 10, 2006 entitled "Prioritized EV-DO Paging Based on Type of Packet Flow".

* cited by examiner

Primary Examiner — Tuan H Nguyen

(57) ABSTRACT

Disclosed herein are methods and systems that may help a radio access network to more intelligently determine an initial transmit power to use for forward-link communications with a mobile station. An exemplary method involves a radio access network: (a) receiving a page response message, wherein the page response message indicates that a page to a mobile station operating in a radio access network has been received by the mobile station; (b) responsive to receiving the page response message, determining an attempt count for the mobile station, wherein the attempt count indicates how many attempts to page the mobile station have been made; (c) using the attempt count as a basis for determining an initial transmit power for forward-link communications with the mobile station; and (d) initiating forward-link communications with the mobile station at the determined initial transmit power.

20 Claims, 4 Drawing Sheets

INTELLIGENT DETERMINATION OF INITIAL TRANSMIT POWER BASED ON RADIO-FREQUENCY CONDITIONS

BACKGROUND

To provide cellular wireless communication service, a wireless service provider or "wireless carrier" typically operates a radio access network (RAN) that defines one or more coverage areas in which mobile stations can be served by the RAN and can thereby obtain connectivity to broader networks such as the public switched telephone network (PSTN) and the Internet. A typical RAN may include one or more base transceiver stations (BTSs) (e.g., macro network cell towers and/or femtocells), each of which may radiate to define a cell and cell sectors in which mobile stations can operate. Further, the RAN may include one or more base station controllers (BSCs) (which may also be referred to as radio network controllers (RNCs)) or the like, which may be integrated with or otherwise in communication with the BTSs, and which may include or be in communication with a switch or gateway that provides connectivity with one or more transport networks. Conveniently with this arrangement, a cell phone, personal digital assistant, wirelessly equipped computer, or other mobile station that is positioned within coverage of the RAN can then communicate with a BTS and in turn, via the BTS, with other served devices or with other entities on the transport network.

Wireless communications between a mobile station and a serving BTS in a given coverage area will typically be carried out in accordance with one or more agreed air interface protocols that define a mechanism for wireless exchange of information between the mobile station and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to mobile stations and a "reverse link" encompassing communications from mobile stations to the BTS. Further, each of these links may be structured to define particular channels, through use of time division multiplexing, code division multiplexing (e.g., spread-spectrum modulation), frequency division multiplexing, and/or some other mechanism.

The forward link, for example, may define (i) a pilot channel on which the RAN may broadcast a pilot signal to allow mobile stations to detect wireless coverage, (ii) system parameter channels (e.g., a sync channel) on which the RAN may broadcast system operational parameters for reference by mobile stations so that the mobile stations can then seek network access, (iii) paging channels on which the RAN may broadcast page messages to alert mobile stations of incoming communications, and (iv) traffic channels on which the RAN may transmit bearer traffic (e.g., application data) for receipt by mobile stations. And the reverse link, for example, may define (i) access channels on which mobile stations may transmit "access probes" such as registration messages and call origination requests, and (ii) traffic channels on which mobile stations may transmit bearer traffic for receipt by the RAN.

When a RAN receives an incoming communication for a mobile station, the RAN typically pages the mobile station via a paging channel in at least the coverage area in which the mobile station last registered. When a cellular wireless communication system seeks to page a mobile station (e.g., for an incoming call or for some other reason), a switch in the network may send the page message to numerous base stations in the switch's coverage area, with the hope that when the base stations broadcast the page message, the mobile station will receive the page message in one of the associated sectors, and will respond. Furthermore, to increase the chances that a mobile station receives a page, a RAN may re-send a page, possibly multiple times, in the event that an attempt to page a mobile station fails.

Once a mobile station is successfully paged, the RAN and mobile station typically proceed to set up a forward-link traffic channel between the BTS and the mobile station, via which the RAN can communicate with the mobile station. As part of this process, the RAN determines the transmit power to use for forward-link traffic. To do so, the RAN may first transmit at an initial transmit power, which is typically a constant power level that is preset at the RAN. The mobile station then evaluates the forward-link signal quality, such as by determining the frame error rate (FER), and reports back to the RAN. Then, depending on the signal quality, the RAN may increase or decrease the transmit power by a predetermined increment. The RAN and mobile station may then repeat this process until a satisfactory signal quality is achieved.

OVERVIEW

An exemplary method may be carried out by a radio access network (RAN) (i.e., by one or more entities of a RAN) in an effort to intelligently determine an initial transmit power for forward-link communications with a mobile station. In particular, the method may be used to help identify when a mobile may be experiencing poor radio-frequency (RF) conditions, and to responsively increase the initial transmit power to the mobile station. This may in turn result in more efficient use of network resources.

More specifically, under IS-2000 the initial transmit power is generally fixed at a lower power level, in order to help avoid using more power than necessary. However, a mobile station that is experiencing poor RF conditions is likely to require a higher transmit power level to compensate for the poor RF conditions. As such, it is likely that the transmit power will be increased from the initial transmit power for a mobile station that is experiencing poor RF conditions. And as the inaccuracy of the initial transmit power increases (i.e., the greater the increase in the transmit power from the initial transmit power), the number of iterations involved in establishing a satisfactory transmit power, and thus the amount of network resources used in the process, increases as well.

Furthermore, when a mobile station is experiencing poor RF conditions, the mobile station is less likely to receive a page. Accordingly, the fact that multiple attempts to send a page were required before the page was successfully received, may indicate poor RF conditions. Thus, exemplary methods and systems may base a determination of initial transmit power to a mobile station upon how many attempts were required to successfully send a page to the mobile station. However, it is also possible that multiple attempts may have been required for reasons other than poor RF conditions. Accordingly, once it is determined that multiple attempts were required to a page a mobile station, exemplary methods and systems may further use RF indicators provided by the mobile station to check whether RF conditions were the likely reason that multiple paging attempts were required, and adjust the initial transmit power accordingly.

In one aspect, an exemplary method involves a radio access network: (a) receiving a page response message, wherein the page response message indicates that a page to a mobile station operating in a radio access network has been received by the mobile station; (b) responsive to receiving the page response message, determining an attempt count for the mobile station, wherein the attempt count indicates how many attempts to page the mobile station have been made; (c) using the attempt count as a basis for determining an initial transmit power for forward-link communications with the mobile station; and (d) initiating forward-link communications with the mobile station at the determined initial transmit power.

In a further aspect, another exemplary method involves a base station in a radio access network: (i) receiving a page to send to a mobile station; (ii) responsive to receiving the page: (a) incrementing an attempt count for the mobile station, (b) transmitting the page, and (c) waiting a predetermined period for a page response message; (iii) if the page response message is received within the predetermined period, then using the attempt count as a basis for determining a forward-link initial transmit power; and (iv) if the page response message is not received within the predetermined period, then refraining from determining the initial transmit power, and repeating the method for any subsequent attempts to send the page.

And in a further aspect, another exemplary method involves a mobile station: (a) maintaining historical radio frequency (RF) conditions data; (b) receiving a page from a radio access network; (c) responsive to receiving the page, the mobile station: (i) sending a page response message to the radio access network; and (ii) providing RF conditions data to the radio access network, wherein the provided RF conditions data is indicative of RF conditions over a predetermined period prior to mobile station receiving of the page; and (d) the mobile station receiving forward-link communications at an initial transmit power, wherein the initial transmit power has been determined by the radio access network based at least in part on the RF conditions data.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1A:
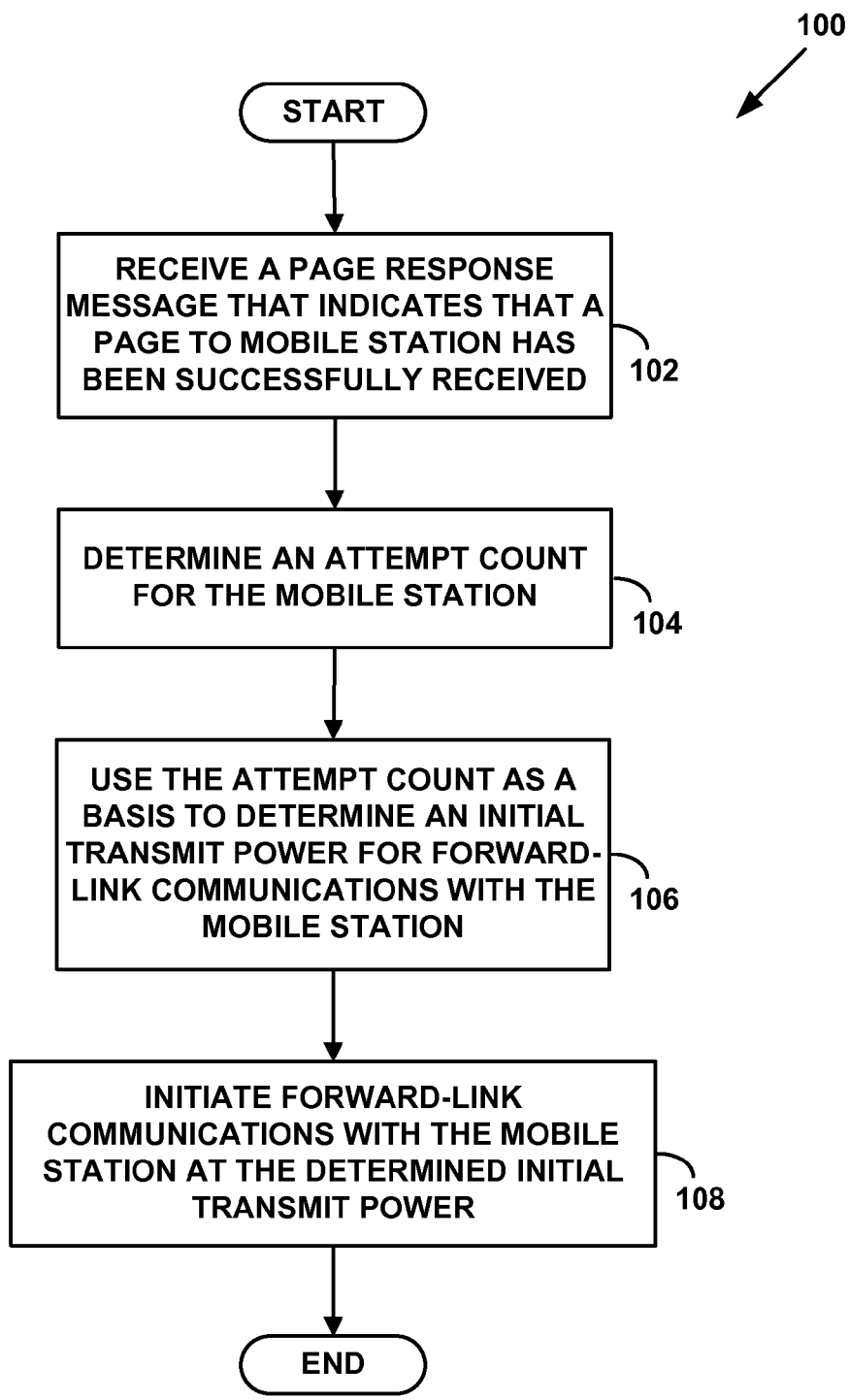
FIG. 1A is a flow chart illustrating a method, according to an exemplary embodiment.

Referring to the drawings, FIG. 1A is a flow chart illustrating a method 100 according to an exemplary embodiment. The method may be carried out by a radio access network (RAN) (i.e., by one or more entities of a RAN), in an effort to intelligently determine an initial transmit power for forward-link communications with a mobile station. It should be understood that in FIG. 1A and throughout this description, functionality attributed to a given RAN entity (e.g., a base transceiver station (BTS), base station controller (BSC), or a mobile switching center (MSC)), may be carried out by other entities as well. Further, exemplary methods such as method 100 may be carried by a single RAN entity or a combination of RAN entities.

As shown in block 102, the method involves a RAN receiving a page response message from a mobile station, where the page response message indicates that a page from a RAN to a mobile station has been successfully received by the mobile station. It is possible that the RAN may have succeeded in reaching the mobile station on the first attempt or that one or more previous attempts to send the page may have failed before a subsequent attempt to send the page succeeded. Since multiple attempts to send a page may indicate poor RF conditions, the RAN then determines an attempt count for the mobile station, which indicates how many attempts to page the mobile station have been made, as shown by block 104. The RAN then uses the attempt count as a basis for determining an initial transmit power for forward-link communications with the mobile station, as shown by block 106. After determining the initial transmit power, the RAN initiates forward-link communications with the mobile station at the determined initial transmit power, as shown by block 108

In an exemplary embodiment, when multiple paging attempts have been made (i.e., when the attempt count is greater than one), the RAN may use an RF Delta as a further basis for determining the initial transmit power for forward-link communications. The RF Delta is preferably a measure of change in RF conditions experienced by the mobile station during a predetermined period prior to receipt of the page. For example, the RF Delta may be the difference between the mobile stations perceived signal strength at the time the page was received and the perceived signal strength when a previous unsuccessful attempt to send the page was made. However, the RF Delta may be calculated using other techniques as well, without departing from the scope of the invention.

Figure 1B:
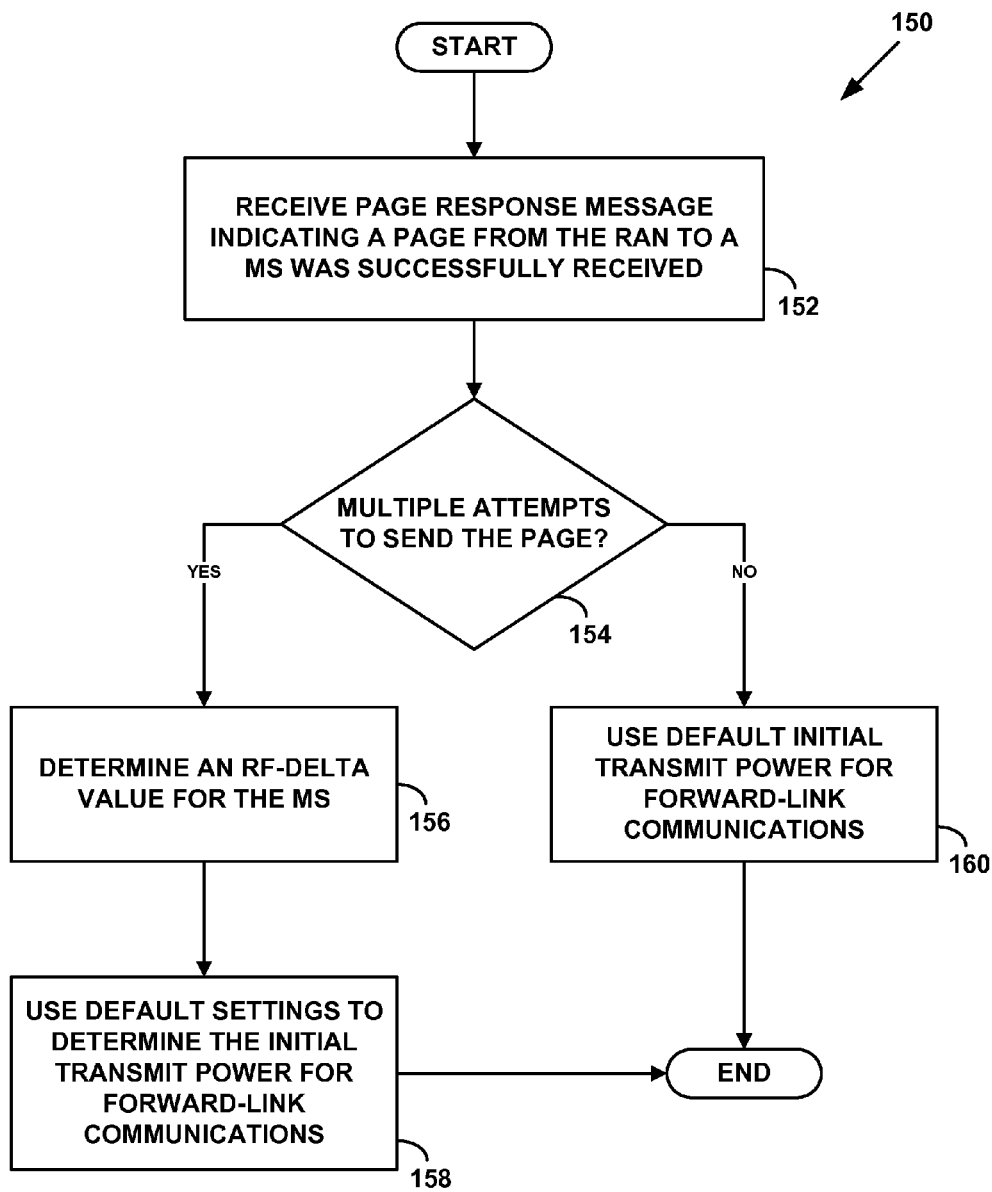
FIG. 1B is another flow chart illustrating a method, according to an exemplary embodiment.

FIG. 1B is a flow chart illustrating a method 150 according to another exemplary embodiment, which involves use of an RF Delta to determine forward-link initial transmit power. In particular, method 150 involves a RAN receiving a page response message, which indicates that a page to a mobile station has been successfully received by the mobile station, as shown in block 152. The RAN then determines whether or not multiple attempts were made to send the page (e.g., by checking the attempt count), as shown by block 154. If multiple attempts were made to send the page, then the RAN determines an RF Delta for the mobile station, as shown by block 156. The RAN may then use the RF Delta as a basis to determine the initial transmit power, which the RAN will initially use for forward-link transmissions to the mobile station, as shown by block 158. Otherwise, the RAN uses default settings to determine the initial transmit power for forward-link transmissions to the mobile station, as shown by block 160.

Preferably, the RF Delta is used to evaluate whether RF conditions might be blamed for having to make multiple attempts to send the page to the mobile station. For instance, improved RF conditions may be the reason why a given paging attempt is successful when a preceding attempt was unsuccessful. In this case, the RF Delta will indicate that the forward-link signal strength has increased in the period leading up to the successful page attempt, and as such, the RAN may determine that it should use a lower initial transmit power (which may also be considered a default initial transmit power). On the other hand, if the mobile station's RF conditions remained fairly steady or worsened, then the mobile station's RF conditions are more likely to blame for an earlier unsuccessful page attempt (given that poor RF conditions make it less likely to receive a page message). In this case, the RAN may determine that it should use a higher initial transmit power than it otherwise would.

In an exemplary embodiment, when the RAN operates under the default settings, a base station may be configured to use a predetermined initial power level. For example, the initial transmit power may be set to 1.2 watts (the setting in many IS-2000 networks) or another constant value. Alternatively, to determine initial transmit power under the default settings, the RAN may use a measurement of the signal strength perceived by the mobile station, and/or a measurement of frame error rate (FER) on the forward link, at or near receipt of the page (as compared to the change in perceived signal strength, which is used when multiple attempts were required). For instance, the RAN may compare the forward-link signal strength or FER to a threshold, and raise the initial transmit power if the signal strength is below (or if the FER is above) the threshold. Other default settings for determining the initial transmit power may exist as well.

Figure 2:
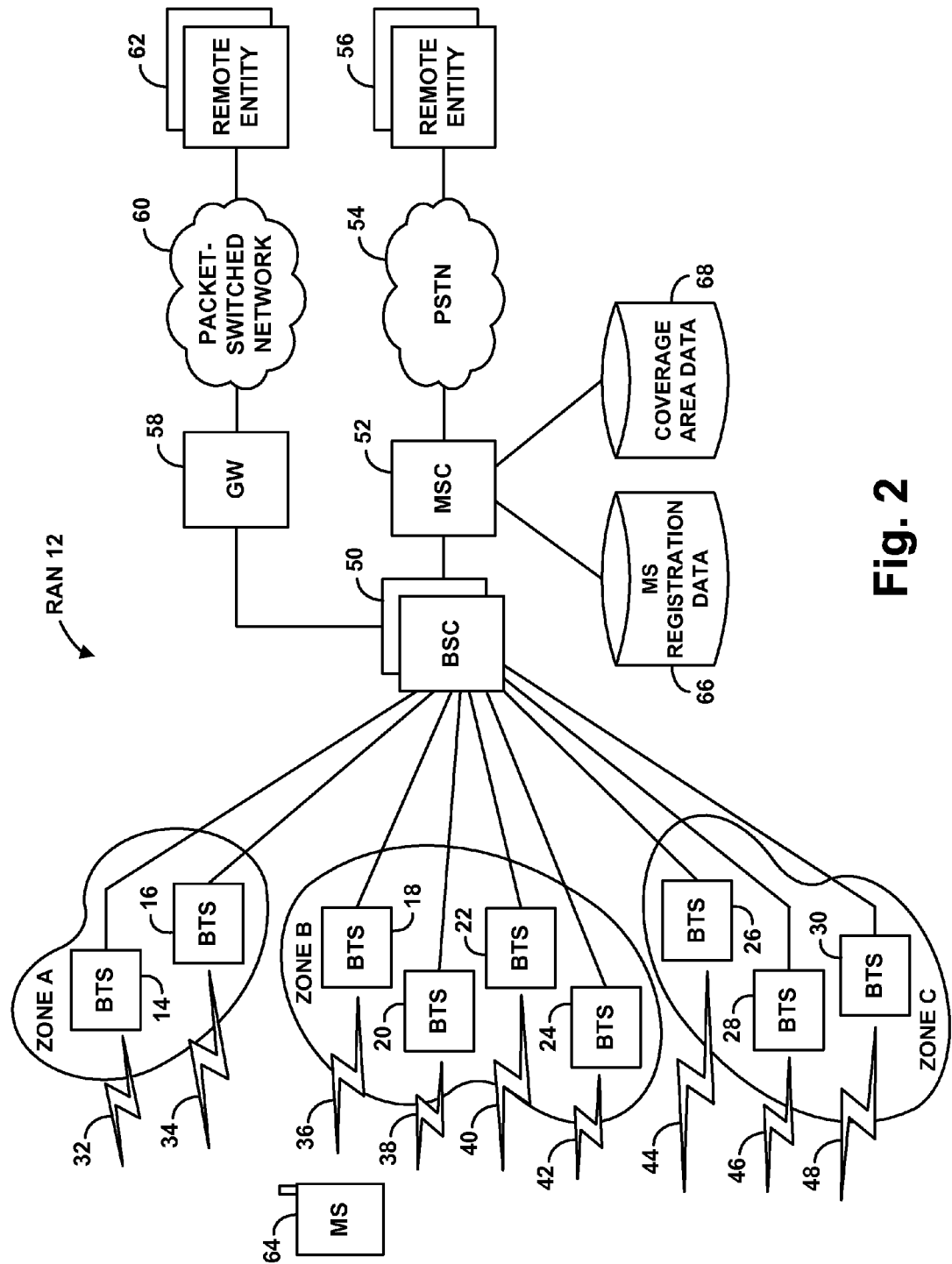
FIG. 2 is a simplified block diagram of a wireless communication network in which the present invention can be implemented.

FIG. 2 is a simplified block diagram of a wireless communication network in which the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, various functions may be carried out by a processor executing program instructions stored in memory or another machine-readable medium (i.e., data storage, rather than a mere signal), to achieve the useful, concrete, and tangible result of determining initial transmit power for a forward-link communication with a given mobile station.

As shown in FIG. 2, the exemplary network includes at its core a radio access network (RAN) 12 that radiates to define numerous coverage areas in which mobile stations can engage in RF communications with the RAN. The RAN may define these coverage areas discretely through use of directional antennas and/or by various modulation parameters, including, without limitation, carrier frequencies and PN offsets or other parameters, depending on the air interface protocol used. Example air interface protocols include CDMA (e.g., IS-95, IS-2000, 1xRTT, 1xEV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served mobile station can move seamlessly from one coverage area to another.

The RAN can take various forms and may include any of a variety and number of components, depending for instance on the air interface protocol employed by the RAN. As such, the RAN may vary in degree of complexity, from a simple wireless access point router to a more complex system such as that shown for instance.

As shown, the RAN may include numerous base stations (also known as base transceiver stations or BTSs), designated in the figure as base stations 14-30 and one or more base station controllers (BSCs) 50 (which may separate entities from or may be integrated with one or more of the base stations 14-30). The base stations preferably include directional antennas, power amplifiers, and associated transceiver equipment arranged to establish corresponding wireless coverage areas 32-48 as shown and to communicate with mobile stations in those coverage areas. The coverage areas shown in the figure can be cell sites, cell sectors, or some other defined wireless coverage area (possibly even a combination of coverage provided by multiple base stations). For simplicity, just a single coverage area is shown emanating from each base station, but it is further understood that a typical base station may provide multiple discrete coverage areas, such as multiple cell sectors for instance.

Each BSC 50 may be coupled with one or more switches, such as a mobile switching center (MSC) 52, which may provide connectivity with the public switched telephone network (PSTN) 54, so that served mobile stations can communicate with remote entities 56 on the PTSN. Additionally or alternatively, each base station controller may be coupled with one or more gateways, such as packet data serving node (PDSN) 58, which provides connectivity with a packet-switched network 60, so that served mobile stations can communicate with remote entities 62 on the packet-switched network.

FIG. 2 depicts a representative mobile station 64 by way of example, which could be a cell phone, wirelessly equipped personal digital assistant (PDA), or any other type of wirelessly-equipped device now known or later developed. The mobile station is preferably equipped with hardware, software, and/or other logic to communicate with RAN 12 in accordance with an agreed communication protocol, such as one of the protocols noted above for instance. For example, in an exemplary embodiment, mobile station 64 includes a wireless communication interface that functions to facilitate air interface communication with RAN 12 according to one or more protocols such as those noted above. Further, mobile station may include a user interface, which typically includes components for receiving input from a user of mobile station and providing output to a user of the mobile station. Yet further, mobile station 64 may include program logic stored in data storage (e.g., one or more volatile and/or non-volatile storage components of the mobile station, such as magnetic, optical, or organic storage components) and executable by one or more processors (e.g., general purpose and/or special purpose processors) to carry out various functions described herein. [6755]

Each mobile station, such as mobile station 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN). [6755]

In another aspect, FIG. 2 depicts the base stations grouped into zones A, B, and C, to facilitate zone-based paging. Each base station may broadcast a zone ID indicating its zone, and a mobile station such as mobile station 64 may monitor the zone IDs broadcast in the coverage areas where the mobile station is operating. When the mobile station detects a change in zone ID, the mobile station 64 may responsively register its presence in the new zone, so that the RAN would then know to page the mobile station in that new zone. [6755]

According to an exemplary embodiment, zones are defined by MSCs (i.e., zone IDs are created, base stations are assigned to a particular zone ID, etc.). It should be understood, however, that other network entities may define paging zones, in combination with or instead of MSC 52, without departing from the scope of the invention. As an example, MSC 52 may create zone IDs corresponding to each zone A-C, and assign base stations 14-16 to zone A, base stations 18-24 to zone B, and base stations 26-30 to zone C.

As shown, MSC 52 also includes or has access to mobile station registration data 66. The mobile station registration data 66 preferably comprises data that specifies per mobile station where the mobile station is currently registered, such as the zone in which the mobile station is currently registered, among possibly other information. More specifically, the mobile station registration data 66 may take the form of a visitor location register (VLR) database, which holds a record per mobile station in the MSC's service area. The mobile station's current zone of registration can thus be indicated in the mobile station's VLR record. Alternatively or additionally, the mobile station registration data can take the form of a home location register (HLR) database 70 that is accessible via the MSC 52. Still alternatively, the data may be stored internally at the MSC or elsewhere in some other form. [6755]

When zone-based paging is employed, the switch (e.g., MSC 52) from which a page is disseminated may track the "paging-attempt status" of a given page; i.e., how many attempts have been made in total to send a given page. For example, an MSC 52 may include or have access to database that tracks the paging-attempt status of pages initiated by the MSC. As such, when a page is successfully received at the intended mobile station, and a page response message received at the base station from which the page was sent, this may be relayed to the switch. The switch then knows not to initiate additional attempts to send the page and refrains from sending pages out to the base station from making additional attempts to send out the page. On the other hand, if the switch does not receive an indication that the page was successful from any base station, the switch will check the paging-attempt status, and if appropriate, send the page to base stations according to the zone-based paging scheme.

Using the general paging strategy that is implemented in many IS-2000 networks, the RAN 12 may make up to three attempts to page a mobile station. In particular, the RAN may first attempt to transmit a page record in the paging zone in which the mobile station is registered (i.e., the base stations in the paging zone in which the mobile station is registered transmit the page record). Then, if the first attempt is unsuccessful (i.e., the mobile station does not acknowledge the page record), the RAN makes a second attempt to page the mobile station by again transmitting the page record in the paging zone in which the mobile station is registered, and possibly in adjacent zones as well. If the second attempt also fails, then the RAN makes a third attempt to page the mobile station, which typically involves a system-wide transmission of the page record (i.e., in all paging zones), although it is possible that a third attempt may be of a different scope as well.

Generally, it should be understood that paging schemes other than zone-based paging may be employed, without departing from the scope of the invention. For instance, a base station may be paged only in the sector in which it is registered, or only in the zone in which it is registered. Other examples are possible as well.

In a further aspect of IS-2000, a base station 14-30 may have up to 61 forward-link traffic channels, for communicating with up to 61 different mobile stations at once (on a given frequency). Each traffic channel is defined by a separate "Walsh code," which is used as a basis for the BSC to encode and the mobile station to decode communications on the channel. For a given channel, the base station implement power control functionality to adjust the power level at which it transmits forward-link communications to a given mobile station via the traffic channel assigned to the mobile station. The transmit power is typically defined, at least in part, by using by a Digital Gain Unit ("DGU") parameter stored by the BSC 50. Specifically, a base station manufacturer may specify a particular scale or algorithm to translate a DGU parameter into a forward link traffic channel power level.

In operation, for a given traffic channel, the BSC 50 will select an initial DGU and will translate the initial DGU into an initial transmit power at which the base station will transmit forward-link traffic to the mobile station assigned to the given traffic channel. As the mobile station receives the traffic, the mobile station will monitor the FER and will report the FER to the base station in an IS-2000 Power Measurement Report Message ("PMRM"). When the base station receives the PMRM, the BSC will determine if the FER is greater than a predetermined threshold (such as 1% for instance). If the BSC 50 determines that the FER is greater than the threshold then the BSC 50 will select a higher DGU, which will translate into a higher transmit power at which the base station will transmit to the mobile station. On the other hand, if the BSC determines that the FER is less than the threshold, then the BSC 50 will select a lower DGU, which will translate into a lower power level. This process of adjusting the transmit power will typically continue throughout the communication session with the mobile station.

According to an exemplary embodiment, a RAN 12 may be configured to intelligently determine initial transmit power when establishing forward-link communication with a mobile station. For example, in an exemplary embodiment, one or more of BTSs 14-30, BSC 50, and/or MSC 52 may include program instructions that are executable to: (a) receive a page response message, wherein the page response message indicates that a page to a mobile station operating in a radio access network has been received by the mobile station; (b) responsive to the page response message, determine an attempt count for the mobile station, wherein the attempt count indicates how many attempts to page the mobile station have been made; (c) use the attempt count as a basis to determine an initial transmit power for forward-link communications with the mobile station; and (d) initiate forward-link communications with the mobile station at the determined initial transmit power.

To facilitate the determination of the attempt count for a given mobile station 64, exemplary base stations 14-30 may maintain or have access to a database storing attempt-count data on a per-mobile station basis. For example, whenever a page intended for mobile station 64 is forwarded to a base station (e.g., to base station 18 via BSC 50) from an MSC 52, the base station may transmit the page and check the database to determine if an entry exists for the mobile station 64. If no entry exists for the mobile station 64, then the base station creates an entry for mobile station 64 and increments the attempt count for the mobile station (e.g., from zero attempts to one attempt). If an entry does exist for mobile station 64, then the base station updates the entry by incrementing the attempt count (e.g., from one attempt to two attempts, or from two attempts to three attempts). Accordingly, to determine whether or not multiple attempts have been made to page a given mobile station, a given base station 14-30 may simply access the attempt-count data for the mobile station and determine how many attempts have been made.

Further, the RAN 12 may reset the attempt count for a given mobile station 64 in a number of circumstances (or alternatively, may simply delete the database entry for the mobile station). Generally, a RAN will reset the attempt count or delete the attempt count data for a given mobile station when a page either succeeds or fails (i.e., when the page is either successfully received by the mobile station or when the maximum number of attempts to send the page are made without success). As such, a base station 18 preferably resets the attempt count for a mobile station 64 whenever the base station receives a page response message from mobile station 64 indicating that the mobile station successfully received the page. This allows for the attempt count to start anew for subsequent pages to the same mobile station.

Further, under some paging schemes, such as zone-based paging, multiple base stations may transmit a page concurrently, meaning it is possible that the one base station may be successful, while another in unsuccessful. As such, MSC 52 may notify a base station that unsuccessfully attempts to send a page, when another base station is successful in doing so. Therefore, a base station 14-30 may also reset its attempt count for a given mobile station when it receives a message from MSC 52 or another RAN entity indicating that the base station should reset the attempt count for a given mobile station 64. Additionally or alternatively, the base station may start an attempt timer when the first attempt to page a mobile station is made, and reset the attempt count for the mobile station when the attempt timer expires.

In some embodiments, a message from the MSC 52 that rather than explicitly indicate to a base station to reset its attempt count for a given mobile station 64, MSC 52 may send a message to the base station indicating that a given page to mobile station 64 was successful. An indication that a page succeeded in turn indicates to the base station that the attempt count should be reset in order to avoid the attempt count carrying over to future pages to the mobile station. For example, in a scenario where MSC 52 has sent a page for transmission by all base stations in zones A and B (i.e. base stations 14-24), and mobile station 64 sends a page response message to base station 18, base station 18 forwards the page response message to MSC 52 (or otherwise indicates to MSC 52 that the page attempt was successful). Responsively, MSC 52 notifies at least BTSs 14-16 and BTS 20-22, and/or BSC 50 (i.e., at least the base stations to which the page was previously sent for transmission, and/or the BSCs associated with those base stations) that the page to the mobile station 64 was successful. The base stations may accordingly reset their respective attempt counts for mobile station 64. Alternatively, when the MSC 52 determines that a page has failed (i.e., that the maximum number of attempts have been made without receiving a page response message at any base station), it may send the base station indicating that the page failed.

In a further aspect, when RAN 12 receives a page response message and determines that multiple attempts were made to transmit the page, the RAN is preferably configured to use an RF Delta to determine the initial transmit power for forward-link communications. The initial transmit power may be determined by any RAN entity or combination of RAN entities. For instance, a BTS may use the RF Delta for a given mobile station to determine the initial transmit power for forward-link communications with that mobile station, or an MSC may determine the initial transmit power in this manner, and convey the initial transmit power to the BTS. Other examples are also possible.

According to one exemplary embodiment, the RAN 12 may calculate the RF Delta using one or more measurements of Ec/Io on the forward link, where Ec is the energy per chip and Io is the total power of all signals received by a mobile station. For example, the RAN 12 may determine an RF Delta by comparing Ec/Io as measured on the forward link at or near the time the mobile station successfully receives the page to an earlier measurement of Ec/Io on the forward link (i.e., a measurement at the beginning if the predetermined period). The mobile station 112 then scans for all of the pilot signals from the sectors in its active set, and measures the received signal strength for each. For instance, mobile station 112 may calculate $E_c/I_o$ for each sector in the active set, where $E_c$ is energy per chip and $I_o$ is the total power received.

The RF Delta itself may take various forms. In an exemplary embodiment, the RF Delta may be calculated differently, depending upon whether a page succeeds on the first attempt, or whether multiple attempts are required before a page succeeds. For example, if the page to a mobile station in a given sector reaches the mobile station on the first attempt in that sector, the RF Delta may simply be set to the Ec/Io at or near receipt of the page. However, if multiple attempts are required, then the RF Delta may indicate the change in signal strength over a predetermined period before the receipt of the page.

As a specific example, if a page to a mobile station reaches the mobile station on the first attempt in a given sector, then an Ec/Io in the range of −10 to −12 dB may be considered an indication of good RF conditions, and the base station may set initial transmit power to a lower power level (e.g., 1.2 watts). If the Ec/Io is in the range of −12 to −16 dB, this may be considered an indication of average RF conditions, and the base station may set initial transmit power to a medium power level (e.g., 1.5 watts). And if the Ec/Io is less than −16 dB, this may be considered an indication of poor RF conditions, and the base station may set initial transmit power to a higher power level (e.g., 1.8 watts).

However, if multiple attempts are required in the sector, then the RF Delta may be a boolean value or a binary value indicating whether the forward-link Ec/Io increased or decreased over the predetermined period before receipt of the page by the mobile station. For example, the RF Delta for a given mobile station may be determined by comparing an Ec/Io measurement at or near successful receipt of a page ($Ec/Io_t$) to an Ec/Io measurement taken at or near when a previous attempt to send the page was made ($Ec/Io_{t-1}$). As a specific example, if $Ec/Io_t$ is greater than $Ec/Io_{t-1}$, indicating that the forward-link RF conditions may have improved, the base station may set initial transmit power to a lower power level (e.g., 1.2 watts). If $Ec/Io_t$ is equal to $Ec/Io_{t-1}$ (or in some embodiments, within a certain range from $Ec/Io_{t-1}$), and it is assumed that poor RF conditions were likely the cause of the previous failed attempt, this indicates that the poor conditions persist. Accordingly, the base station may set the initial transmit power to a higher power level (e.g., 1.5 watts). Furthermore, if $Ec/Io_t$ is less than $Ec/Io_{t-1}$, then this likely indicates that RF conditions have degraded since the previous failed attempt. The base station may therefore set the initial transmit power to a higher power level, which may be the same as when $Ec/Io_t$ is equal to $Ec/Io_{t-1}$ (e.g., 1.5 watts), or may be an even higher power level (e.g., 1.8 watts).

Additionally or alternatively, the RF Delta may be based upon the forward error rate (FER) as measured by a mobile station. Techniques for measuring the FER at a given point in time are well known to those skilled in the art, and thus not discussed in detail herein. In one exemplary embodiment, if a page to a mobile station reaches the mobile station on the first attempt in a given sector, the RF Delta may simply be set to the FER as measured by the mobile station at or near the time when the mobile station receives the page. However, if multiple attempts are required, then the RF Delta may indicate the change in the FER over a predetermined period before the receipt of the page. As mobile stations typically measure FER, an exemplary mobile station may be further configured to store historical FER measurements, so that the mobile station can report historical FER measurement to the RAN. The RAN can then use the historical FER measurements to determine the change in FER over the predetermined period.

As a specific example, if a page to a mobile station reaches the mobile station on the first attempt in a given sector, then an FER that is less than 2 dB may be considered an indication of good RF conditions, and the base station may set initial transmit power to a lower power level (e.g., 1.2 watts). If the FER is in the range of 2 to 4 dB, this may be considered an indication of average RF conditions, and the base station may set initial transmit power to a medium power level (e.g., 1.5 watts). And if the FER is greater than 4 dB, this may be considered an indication of poor RF conditions, and the base station may set initial transmit power to a higher power level (e.g., 1.8 watts).

However, when multiple attempts in the given sector are required, then the RF Delta may be a boolean value or a binary value indicating whether the FER increased or decreased over the predetermined period before receipt of the page by the mobile station. For example, the RF Delta for a given mobile station may be determined by comparing an FER measurement at or near successful receipt of a page ($FER_t$) to an FER measurement taken at or near when a previous attempt to send the page was made ($FER_{t-1}$). As a specific example, if $FER_t$ is less than $FER_{t-1}$, thus indicating that the forward-link RF conditions may have improved, the base station may set initial transmit power to a lower power level (e.g., 1.2 watts). If $FER_t$ is equal to $FER_{t-1}$ (or in some embodiments, within a certain range from $FER_{t-1}$), and it is assumed that poor RF conditions were likely the cause of the previous failed attempt, this indicates that the poor conditions persist. Accordingly, the base station may set the initial transmit power to a higher power level (e.g., 1.5 watts). Furthermore, if $FER_t$ is greater than $FER_{t-1}$, then this likely indicates that RF conditions have degraded since the previous failed attempt. The base station may therefore set the initial transmit power to a higher power level, which may be the same as when $FER_t$ is equal to $FER_{t-1}$ (e.g., 1.5 watts), or may be an even higher power level (e.g., 1.8 watts).

In another alternative embodiment, the RF Delta may be calculated as the actual change in signal strength over the predetermined period. For example, the RF Delta may be determined by subtracting the forward-link Ec/Io at the beginning of the predetermined period from the forward-link Ec/Io at or near receipt of the page. As such, the RF Delta may take the form of a decibel value indicating the change in decibel level over the predetermined period. Further, the RF Delta may take other forms as well, without departing from the scope of the invention.

The predetermined period over which the RF Delta is determined may be selected as a matter of engineering design choice. For instance, the predetermined period may be substantially equal to an MSC's waiting period between consecutive paging attempts. More specifically, consecutive paging attempts under IS-2000 are typically separated by two 5.12 second slot cycles (i.e., separated by 10.24 seconds). As such, the predetermined period may be set at ten seconds (or possibly set at exactly 10.24 seconds). This is but one example, and generally, the predetermined period over which the RF Delta is determined may be selected so that the RF Delta provides an indication of whether the RF conditions improved, degraded, or stayed the same between attempts to send a page, or may be selected based on other criteria altogether.

In a further aspect, it is possible that the RAN 12 may dynamically vary the predetermined period over which the RF Delta is determined on a page-by-page basis, and further may include an indication of the period in the page (thus notifying a mobile station of the period so that it can provide appropriate Ec/Io values). For example, the RAN 12 may vary the period so that the period is equal to or proportional to the actual time between a successful page attempt and a previous unsuccessful page attempt. Other examples are also possible.

When the first attempt to page a mobile station is successful (i.e., when multiple attempts are not required), a RAN 12 is preferably configured to use default settings to determine the initial transmit power for forward-link communications. For instance, the RAN 12 may simply set the initial transmit power to a default value (e.g., 1.2 watts), in a similar manner as existing IS-2000 networks do for all communications. However, the RAN 12 may also implement additional intelligence to account for RF conditions when a first paging attempt succeeds. In particular, since there can be no change in RF conditions between paging attempts when only one attempt is required (and thus no RF Delta), the RAN 12 may use a forward-link signal strength indication at or near the time of the page to determine the initial transmit power. For example, the RAN 12 may compare the forward-link Ec/Io, as measured by the mobile station at or near the time the mobile station receives the page, to a threshold value, and adjust initial transmit power accordingly. As a specific example, the RAN 12 may increase initial transmit power when Ec/Io is less than −16 dB. Other examples are also possible.

In a further aspect, attempt counts for each mobile station are preferably maintained on per-zone basis (i.e., counted per zone). As such, it is possible that the first paging attempt in a given zone is actually the second or third paging attempt overall (or more generally, the paging-attempt status maintained by MSC 52 may differ from the attempt count at a given base station). A per-zone attempt count is inherent in an exemplary embodiment where BTSs 14-30 in RAN 12 maintain the attempt counts. In particular, since each BTS 14-30 only increments the attempt count for a given mobile station when it receives a page from MSC 52, the attempt count will not be incremented when a page is sent in a zone that does not encompass the base station.

In an alternative embodiment, attempt count data may be maintained by switches (e.g., MSC 52) in RAN 12. In such an embodiment, the switch may track the attempt count for each mobile station on a per-zone basis. As such, the attempt count data stored at the switch may additionally indicate the number of attempts to send a given page that have been made in each zone. Thus, once MSC 52 receives an indication that a page from a given BTS 18 has succeeded, MSC 52 may send a message to BTS 18 indicating whether or not multiple attempts were made (or possibly the actual number of attempts made in the zone in which BTS 18 is located), so that the MSC can determine the RF Delta accordingly. To do so, MSC 52 may determine the zone in which the BTS 18 is located and access the attempt count data to determine how many attempts were made in that zone. Further, once a page response is received at one BTS 18, the MSC 52 preferably resets the attempt count in all zones in which an attempt count exists for the given mobile station.

It should be understood that while tracking attempt count on a per-zone basis may be preferable, the MSC 12 may also track an overall attempt count that is incremented whenever an attempt to page a mobile station is made (regardless of which zone or zones the attempt is made in), and use the overall attempt count data in the same manner as the per-zone attempt count data. To implement such an embodiment, a RAN may simply use the paging-attempt status maintained at the switch, which indicates the total number of attempts that have been made to send a given page, as the attempt count for a given mobile station.

Mobile stations typically calculate Ec/Io on a regular basis in the process of maintaining an active set of sectors, which are candidates for connecting to the RAN. For example, under IS-2000, a mobile station 64 typically scans for all of the pilot signals from the sectors in its active set, and measures the received signal strength for each. To facilitate the determination of the RF Delta, an exemplary mobile station 64 may also store historical forward-link Ec/Io measurements. As such, when the mobile station 64 receives a page, the mobile station can determine (a) the Ec/Io upon receipt of the page, and (b) the Ec/Io at the beginning of the predetermined period.

Having stored historical Ec/Io values, a mobile station may then report one or more forward-link Ec/Io values to RAN 12, which the RAN in turn may use to calculate the RF Delta for the mobile station. For instance, if the predetermined period that is used for the RF Delta is ten seconds, the mobile station 64 may determine Ec/Io when it receives a page, and look up the Ec/Io from ten seconds earlier. The mobile station 64 may then include and indication of these two forward-link Ec/Io values in its page response message, or in another message to RAN 12 associated with the page response message, thus providing these values to RAN 12.

According to an alternative embodiment, the mobile station 64 may itself use the forward-link Ec/Io measurements to determine the RF Delta. The mobile station may therefore report the RF Delta to the RAN 12 so that the RAN can use the RF Delta to determine initial transmit power.

While not always the case, the reverse-link RF conditions may serve as an adequate proxy for forward-link RF conditions. Accordingly, in another alternative embodiment, the RAN 12 may use reverse-link Ec/Io data as a proxy for forward-link RF conditions in order to determine the RF Delta. In particular, the RAN 12 may periodically or continuously measure the reverse-link Ec/Io between the RAN and a given mobile station, and then store historical reverse-link Ec/Io measurements. As such, the RAN 12 may use reverse-link Ec/Io measurements to determine the RF Delta in the same or a similar manner as described in reference to forward-link Ec/Io measurements received from a mobile station. In such an embodiment, it may be assumed that the reverse-link and forward-link have similar RF conditions. Use of reverse-link Ec/Io data may provide an advantage over use of forward-link Ec/Io data since the mobile station does not need to provide forward-link Ec/Io measurements to the RAN.

Figure 3:
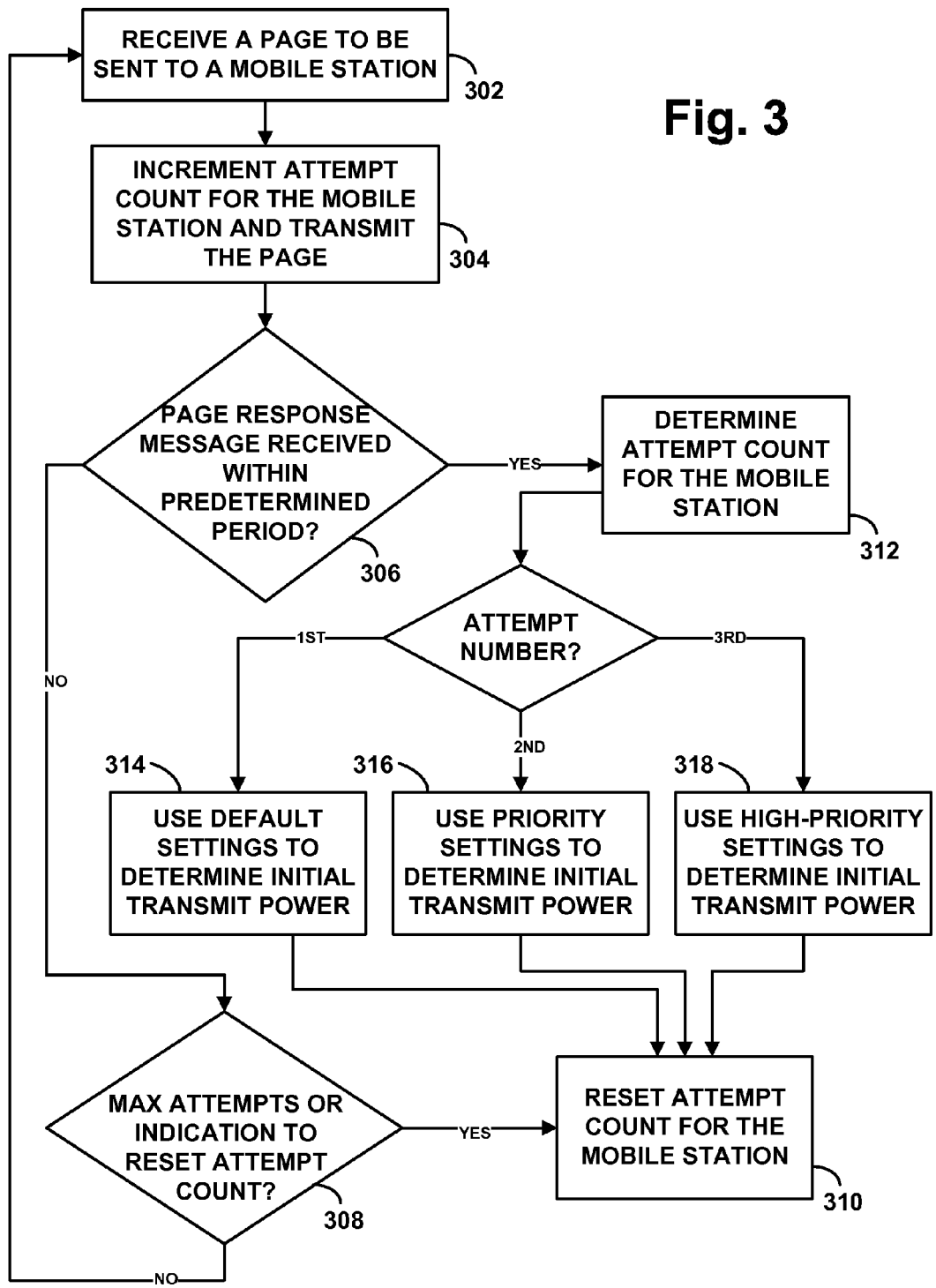
FIG. 3 is another flow chart illustrating a method, according to an exemplary embodiment.

FIG. 3 is another flow chart illustrating a method 300, according to an exemplary embodiment. Method 300 is described as being implemented in a RAN in which the maximum number of paging attempts is set at three, in which a zone-based paging scheme is implemented, and in which base stations maintain attempt counts (inherently counting attempts on a per-zone basis). However, it should be understood that exemplary methods may be implemented in RANs of differing configurations without departing from the scope of the invention.

As shown, method 300 involves a base station receiving a page to send to a given mobile station, as shown by block 302. The base station responsively increments the attempt account for the mobile station and transmits the page, as shown by block 304. After transmitting the page, the base station waits for a predetermined period of time for a page response message from the mobile station, as shown by block 306. If no page response message is received, the base station determines whether the maximum number of paging attempts have been made (i.e., whether the attempt count is now at three), and/or determines whether a message has been received from the switch indicating that the base station should reset the attempt count, as shown by block 308. If the maximum number of attempts has been made, or if an indication to reset the attempt count is received, the base station resets the attempt count for the mobile station, as shown by block 310. However, if the base station receives another page for transmission to the mobile station (i.e., a subsequent attempt to send the page) before receiving an indication to reset the attempt count, the base station may repeat the method 300 starting at block 302.

In the event that a page response message is received from the mobile station, the base station proceeds to determine the current attempt count for the mobile station, as shown by block 312. The base station then determines the initial transmit power for forward-link communications with the mobile station according to whether the page succeeded on the first, second, or third attempt. In particular, if the mobile station received the page successfully on the first attempt, the base station uses default settings for determining the initial transmit power, as shown by block 314. If the mobile station received the page successfully on the second attempt, the base station uses priority settings for determining the initial transmit power, as shown by block 316. And if the mobile station received the page successfully on the third attempt, the base station uses high-priority settings for determining the initial transmit power, as shown by block 318. Further, since the page was successful, the base station resets the attempt count for the mobile station, as shown by block 310, in order that an attempt count may be started anew for any future page to the same mobile station.

According to an exemplary embodiment, the default settings used to determine initial transmit power may be either standard IS-2000 settings (i.e., a predefined constant initial transmit power). Preferably, however, the initial transmit power is determined more intelligently, for instance by using the forward-link signal strength (e.g., Ec/Io) as described above and/or using the frame error rate (FER) measured on the forward link at or near the time the page is received by the mobile station. In general, when the forward-link signal strength is lower and/or the FER is higher, this is indicative of lesser RF conditions, and the initial transmit power may be increased accordingly.

When the RF Delta indicates that RF conditions have improved between a successful paging attempt and a previous unsuccessful attempt, this indicates that poor RF condition that likely caused the previous attempt to fail are no longer an issue. Thus, under the priority settings in an exemplary method may cause the initial transmit power to be set to a lower value. For example, the base station may set the initial transmit power at 1.2 watts (i.e., the default transmit power typically used for IS-2000 communications), or at another wattage selected as a matter of engineering design choice. If, on the other hand, the RF Delta indicates that RF conditions are the same or have worsened between the successful paging attempt and the previous unsuccessful attempt, then the base station may increase that initial transmit power. For example, the base station may set the initial transmit power at 1.5 watts, or at another higher wattage selected as a matter of engineering design choice.

In a further aspect, the high-priority settings may be such that the initial transmit power is determined in the same manner as under the priority settings, except that the resultant initial transmit powers are increased. For example, the base station may again set the initial transmit power at 1.2 watts when the RF Delta indicates that RF conditions have improved. However, using the high-priority settings, the base station may set the initial transmit power at 1.8 watts, for instance, when the RF Delta indicates that RF conditions are the same or have worsened. Other variations are possible as a matter of engineering design choice.

As an example of FIG. 3 in practice, and referring to the network configuration shown in FIG. 2, MSC 52 may receive a page intended for mobile station 64, which was last registered in zone B. According to a zone-based paging strategy, MSC 52 first attempts to send the page in zone B (BTSs 18-24), and if necessary makes a second attempt in zone A (BTSs 14-16) and zone B, and a third attempt in zone A, zone B, and zone C (BTSs 26-30). Accordingly, when MSC 52 receives the page, it first sends the page to BTS 18-24 (zone B), which all transmit the page and increment their respective attempt counts for mobile station 64 to one attempt.

If a page response message is received at one of the BTSs 18-24 in zone B, then that BTS determines the initial transmit power according to the default settings. For example, if BTS 18 receives the page response message, it may use Ec/Io as measured by the mobile station 64 when it received the page (which may be provided to BTS 18 in the page response message), to determine the initial transmit power. Further, BTS 18 resets its attempt account for mobile station 64 and notifies MSC 52 that the page was successful. In turn, MSC 52 may instruct BTSs 20-24 to reset their respective attempt counts for mobile station 64.

On the other hand, if mobile station 64 experiences poor RF conditions that cause the first attempt to fail, MSC 52 makes a second attempt by sending the page to BTSs 14-24 (i.e., expanding paging efforts to both zones A and B). Each BTS 14-24 then transmits the page and increments its respective attempt count for mobile station 64. As BTSs 18-24 (zone B) have previously made an attempt to page the mobile station, these BTSs each increment their respective attempt counts to two, whereas BTSs 14-16 (zone A) have not yet made an attempt, and thus increment their respective attempt counts to one. Therefore, if a page response message is received at one of the BTSs 18-24, where the attempt count is at two, then that BTS determines the initial transmit power according to the priority settings. However, if a page response message is received at one of the BTSs 14-16, where the attempt count is at one, then that BTS determines the initial transmit power according to the default settings. In either case, the BTS that receives the page response message resets its attempt account for mobile station 64 and notifies MSC 52 that the page was successful. In turn, MSC 52 instructs at least the other BTSs in zones A and B (possibly with the exception of the BTS that received the page response message) to reset their respective attempt counts for mobile station 64.

Further, if mobile station 64 continues to experience poor RF conditions, and the first and second attempts both fail, MSC 52 makes a third and final attempt by sending the page to BTSs 14-30 (i.e., expanding to zones A, B, and C). BTSs 14-30 each transmit the page and increment their respective attempt counts for mobile station 64. As BTSs 18-24 (zone B) have previously made two paging attempts, these BTSs each increment their respective attempt counts to three, whereas BTSs 14-16 (zone A) have previously made one paging attempt, and thus increment their respective attempt counts to two, and BTSs 26-30 (zone C) have not made any paging attempts, and thus increment their respective attempt counts to one. Therefore, if a page response message is received at one of the BTSs 18-24, where the attempt count is at three, then that BTS determines the initial transmit power according to the high-priority settings.

If a page response message is received at one of the BTSs 14-16, where the attempt count is at two, then that BTS determines the initial transmit power according to the priority settings. And if a page response message is received at one of the BTSs 14-16, where the attempt count is at one, then that BTS determines the initial transmit power according to the default settings. In any of these scenarios, the BTS that receives the page response message resets its attempt account for mobile station 64 and notifies MSC 52 that the page was successful. In turn, MSC 52 instructs the BTSs in zones A, B and C (possibly with the exception of the BTS that received the page response message) to reset their respective attempt counts for mobile station 64.

In the event that all three attempts by MSC 52 fail, meaning that no more attempts will be made under the zone-based paging scheme, MSC 52 instructs all the BTSs involved in the paging attempts (i.e., BTSs 14-30) to reset their respective attempt counts for mobile station 64, thus preparing BTSs 14-30 in the event that another page arrives for mobile station 64. Furthermore, as the attempt count at each of BTSs 18-24 is at three attempts, these BTSs may detect that their respective attempt counts are equal to the maximum number of attempts under the zone-based paging scheme, and responsively reset their respective attempt counts. By doing so, these BTSs may be able to reset their attempt counts more quickly, before any such instruction from MSC 52 is received. However, it should be understood that the feature of a base station resetting based on its attempt count equaling the maximum number of attempts allowed is optional in this method, as the BTSs may instead simply rely on reset instructions from MSC 52.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented in whole or in part by software (e.g., machine language instructions stored in data storage and executable by a processor), firmware, and/or hardware.

We claim:

1. A method comprising:
a radio access network receiving a page response message, wherein the page response message indicates that a page to a mobile station operating in the radio access network has been received by the mobile station;
responsive to receiving the page response message, determining an attempt count for the mobile station, wherein the attempt count indicates how many attempts to page the mobile station have been made by the radio access network;

the radio access network using the attempt count as a basis for determining an initial transmit power for forward-link communications with the mobile station; and initiating forward-link communications with the mobile station at the determined initial transmit power.

2. The method of claim 1, wherein a plurality of paging zones are defined in the radio access network, and wherein the attempt count indicates how many attempts to page the mobile station have been made in a zone in which the mobile station received the page.

3. The method of claim 2, wherein the predetermined period prior to receipt of the page is a period between a time at or near when the mobile station received the page and a time at or near a previous unsuccessful attempt to send the page.

4. The method of claim 2, wherein the RF Delta for the mobile station indicates an overall direction of change in signal strength during the predetermined period prior to receipt of the page.

5. The method of claim 2, wherein determining the RF Delta for the mobile station comprises:
  receiving one or more signal strength measurements from the mobile station; and
  using the one or more signal strength measurements as a basis for determining the RF Delta.

6. The method of claim 5, wherein the one or more signal strength measurements comprise: (a) a measure of signal strength at or near when the mobile station received the page and (b) a measure of signal strength at the beginning of the predetermined period, time at or near a previous unsuccessful attempt to send the page.

7. The method of claim 2, wherein determining the RF Delta for the mobile station comprises receiving the RF Delta from the mobile station.

8. The method of claim 2, wherein the using the default settings comprises either (a) setting the initial transmit power for forward-link transmissions equal to a predefined constant initial transmit power or (b) using a forward-link signal-strength indication at or near a time when the mobile station received the page as a basis for determining the initial transmit power for forward-link transmissions.

9. The method of claim 1, wherein using the attempt count as a basis for determining an initial transmit power for forward-link communications with the mobile station comprises:
  determining whether or not multiple attempts were made to send the page;
  if multiple attempts were made to send the page, then:
    (i) determining an RF Delta for the mobile station, wherein the RF Delta is a measure of change in RF conditions experienced by the mobile station during a predetermined period prior to receipt of the page; and
    (ii) using the RF Delta as a basis for determining a forward-link initial transmit power for forward-link transmissions to the mobile station; and
  otherwise, using default settings to determine the forward-link initial transmit power for forward-link transmissions to the mobile station.

10. The method of claim 1, wherein a maximum of three attempts can be made to send the page, and wherein using the attempt count as a basis for determining the initial transmit power for forward-link communications with the mobile station comprises:

if the attempt count is at one attempt, then using default settings to determine the forward-link initial transmit power for forward-link transmissions to the mobile station;

if the attempt count is at two attempts, then using priority settings to determine the initial transmit power for forward-link transmissions to the mobile station; and if the attempt count is at three attempts, then using high-priority settings to determine the initial transmit power for forward-link transmissions to the mobile station.

11. The method of claim 10, wherein:
using the priority settings or the high-priority settings to determine the initial transmit power for forward-link transmissions comprises:
determining an RF Delta for the mobile station, wherein the RF Delta is a measure of change in RF conditions experienced by the mobile station during a predetermined period prior to receipt of the page; and
using the RF Delta as a basis for determining the initial transmit power for forward-link transmissions to the mobile station;
wherein, if the RF Delta indicates that RF conditions have stayed the same or worsened over the predetermined period, the determined initial transmit power is greater under the high-priority settings, than under the priority settings.

12. A method comprising:
at a base station in a radio access network, receiving a page to send to a mobile station;
responsive to receiving the page: (a) incrementing an attempt count for the mobile station, wherein the attempt count indicates how many attempts to page the mobile station have been made by the radio access network, (b) transmitting the page, and (c) waiting a predetermined period for a page response message;
if the page response message is received within the predetermined period, then using the attempt count as a basis for determining a forward-link initial transmit power; and
if the page response message is not received within the predetermined period, then refraining from determining the initial transmit power, and repeating the method for any subsequent attempts to send the page.

13. The method of claim 12, wherein using the attempt count as a basis for determining the forward-link initial transmit power comprises:
if multiple attempts were made to send the page, then:
  (i) determining an RF Delta for the mobile station, wherein the RF Delta is a measure of change in RF conditions experienced by the mobile station during a predetermined period prior to receipt of the page; and
  (ii) using the RF Delta as a basis for determining an initial transmit power for forward-link transmissions to the mobile station; and
otherwise, using default settings to determine the initial transmit power for forward-link transmissions to the mobile station.

14. The method of claim 12, further comprising, if the page response message is received within the predetermined period, then resetting the attempt count.

15. The method of claim 12, further comprising:
after waiting the predetermined period, the base station receiving an indication from a switch to reset the attempt count; and
the base station responsively resetting the attempt count.

16. A method comprising:
a mobile station maintaining historical radio frequency (RF) conditions data;
the mobile station receiving a page from a radio access network;
responsive to receiving the page, the mobile station:
- (i) sending a page response message to the radio access network; and
- (ii) providing RF conditions data to the radio access network, wherein the provided RF conditions data is indicative of RF conditions over a predetermined period prior to mobile station receiving of the page; and the mobile station receiving forward-link communications at an initial transmit power, wherein the initial transmit power has been determined by the radio access network based at least in part on the RF conditions data;
wherein:
- if the page was received on a first attempt to send the page, then the initial transmit power is determined by the radio access network according to default settings; and
- if the page was received on a subsequent attempt to send the page, then the initial transmit power is determined by the radio access network based on an RF Delta, wherein the RF Delta is a measure of change in RF conditions experienced by the mobile station during the predetermined period prior to receipt of the page.

17. The method of claim 16, wherein the RF conditions data comprises an indication of signal strength at receipt of the page by the mobile station and an indication of signal strength at a beginning of the predetermined period.

18. A radio access network component comprising:
at least one tangible computer-readable medium; and
program logic stored on the at least one tangible computer-readable medium and executable by at least one processor to:
- (a) receive a page response message, wherein the page response message indicates that a page to a mobile station operating in a radio access network has been received by the mobile station;
- (b) responsive to the page response message, determine an attempt count for the mobile station, wherein the attempt count indicates how many attempts to page the mobile station have been made by a radio access network;
- (c) use the attempt count as a basis to determine an initial transmit power for forward-link communications with the mobile station; and
- (d) initiate forward-link communications with the mobile station at the determined initial transmit power.

19. The radio access network of claim 18, wherein a plurality of paging zones are defined in the radio access network, and wherein the attempt count indicates how many attempts to page the mobile station have been made in a zone in which the mobile station received the page.

20. The radio access network of claim 18, wherein program logic stored on the at least one tangible computer-readable medium and executable by at least one processor to use the attempt count as a basis to determine the initial transmit power for forward-link communications with the mobile station comprises program logic stored on the at least one tangible computer-readable medium and executable by the at least one processor to:
determine whether or not multiple attempts were made to send the page;
if multiple attempts were made to send the page, then:
- (i) determine an RF Delta for the mobile station, wherein the RF Delta is a measure of change in RF conditions experienced by the mobile station during a predetermined period prior to receipt of the page; and
- (ii) use the RF Delta as a basis for determining a forward-link initial transmit power for forward-link transmissions to the mobile station; and otherwise, use default settings to determine the forward-link initial transmit power for forward-link transmissions to the mobile station.

* * * * *